US005934788A

United States Patent [19]

Wolfe

[11] Patent Number: 5,934,788

[45] Date of Patent: Aug. 10, 1999

[54] RECESSED LIGHTING TRIM STRUCTURE

[75] Inventor: Denis G. Wolfe, Diablo, Calif.

[73] Assignee: Prescolite-Moldcast Lighting Company, San Leandro, Calif.

[21] Appl. No.: 08/814,024

[22] Filed: Mar. 10, 1997

[51] Int. Cl.[6] ................................ F21S 1/02; F16M 13/00

[52] U.S. Cl. .......................... 362/148; 362/364; 362/287; 362/427; 248/519

[58] Field of Search .................................... 362/364, 365, 362/147, 148, 366, 287, 427; 248/519, 521, 523

[56] References Cited

U.S. PATENT DOCUMENTS

| | | | |
|---|---|---|---|
| 3,381,123 | 4/1968 | Docimo | 362/366 |
| 3,518,420 | 6/1970 | Kripp . | |
| 3,609,346 | 9/1971 | Lund | 362/364 |
| 4,306,279 | 12/1981 | Cohen . | |
| 4,419,717 | 12/1983 | Price et al. | 362/148 |
| 5,130,914 | 7/1992 | Bengochea | 362/364 |
| 5,457,617 | 10/1995 | Chan et al. | 362/366 |
| 5,562,343 | 10/1996 | Chan et al. | 362/364 |

*Primary Examiner*—Ira S. Lazarus
*Assistant Examiner*—David Lee
*Attorney, Agent, or Firm*—Theodore J. Bielen, Jr.

[57] ABSTRACT

A trim for a recessed lighting utilizing a carrier having a first member with a flange extending outwardly from the same. The member includes an opening to permit light to pass from a lamp. A yoke is also found in the trim of the present invention and includes first and second legs connected by a bridging member. The yoke includes a mechanism for rotating or folding the same toward and away from the carrier.

4 Claims, 2 Drawing Sheets

RECESSED LIGHTING TRIM STRUCTURE

BACKGROUND OF THE INVENTION

The present invention relates to a novel trim structure or a recessed lighting fixture.

Recessed lighting fixtures are normally referred to as "cans". Once a recessed lighting can has been installed in a wall or ceiling, a trim is employed to provide a finished appearance and, to a lesser degree, to control light emanating from the recessed lighting fixture. Certain trims include a ring which is attached to the recessed lighting can through attached of wires or springs. In other cases, trims include baffles which extend upwardly into the vicinity of the lamp that is placed in the socket within the recessed lighting fixture. The most reliable way to provide a trim for a recessed lighting fixture is to employ a yoke, in combination with a trim carrier or a ring, such that the yoke at least partially surrounds a portion of the socket and lamp within the recessed lighting fixture.

Where a yoke is not employed in connection with a trim, the lamp socket may be fixed in various positions relative to the can. That is to say, the socket may lie in an excessively recessed position or extend beyond the trim. The latter structure presents an aesthetically unacceptable appearance. Also, lighting projection from the can becomes unpredictable where the lamp socket position varies.

Unfortunately, provision of a yoke with the carrier of the trim is unwieldy, since the combination of the yoke and carrier of the trim results in a bulky unit. In addition, transportation and shipping of the combined yoke and carrier tends to render such a unit susceptible to damage.

U.S. Pat. Nos. 4,306,279 and 5,457,617 show recessed lighting fixtures that employ yokes or holders for the can in various positions.

U.S. Pat. No. 3,518,420 describes a yoke and trim combination which is adjustable along the axis of the lamp. The trim and yoke are separable and must assembled for use.

A trim for a recessed lighting fixture which overcomes the disadvantages found in the prior art would be a notable advance in the lighting field.

SUMMARY OF THE INVENTION

In accordance with the present invention a novel and useful trim for a recessed lighting fixture is herein provided.

The trim of the present invention utilizes a carrier which is normally in the form of a ring that is intended to lie against the paneling or wall material within which the recessed lighting fixture is mounted. The carrier includes a flange which extends outwardly from a ring member, leaving an opening through the central portion of the ring member to permit light to shine from the lamp within the recessed lighting fixture. The flange extending from the carrier may be of uniform height and may extend around the carrier completely or partially.

A yoke is also employed in the present invention. The yoke includes first and second legs and a spanning element which connects the first and second legs. The spanning element may extend upwardly and into the recessed lighting can for which the trim of the present invention is intended to be used. The spanning element may also include an opening such that the spanning element at least partially surrounds a portion of the lamp and socket found in the recessed lighting fixture. Each of the legs may be constructed of resilient or springy material and include the provision of a spring bias outwardly from the carrier flange.

Rotation means for folding the yoke toward and away from the carrier is also included in the present invention. Such rotation means may take the form of a first pivot between the first leg and carrier flange, and a second pivot between the second leg and the carrier flange. The pivot may take the form of a pin or other elongated member which extends between the legs of the yoke and carrier flange. The pivot may also be positioned toward the outer periphery of the flange to allow a sufficient portion of the yoke to rotate into the trim carrier, which may be a shallow curved body in certain cases.

Latching means is also found in the present invention when the yoke is rotated from a folded position toward the carrier to a generally upright position away from the carrier. The latching means may take the form of a recess formed in each of the legs of the yoke and a protuberance which extends from the flange of the carrier in angular orientation relative to the recesses found in the legs of the yoke. The spring biasing of the yoke legs tend to maintain the interconnection between the protuberance and the recesses of the yoke legs, when the yoke is rotated outwardly from the trim carrier. In this position, the yoke and trim may be employed in the usual manner by the use of springs or wires to hold the same in place within the recessed lighting can.

It may be apparent that a novel and useful trim for a recessed lighting fixture has been described.

It is therefore an object of the present invention to provide a trim for a recessed lighting fixture which includes a carrier and yoke combination with a mechanism that allows the collapsing of the combined yoke and carrier unit into a slim configuration.

Another object of the present invention is to provide a trim for a recessed lighting fixture which includes a yoke and carrier combination unit that is collapsible into a slim configuration, preventing damage to the same during shipping.

Another object of the present invention is to provide a trim for a recessed lighting fixture utilizing a carrier and yoke that moves from a collapsed position to an extended position and may be used in a conventional manner in a recessed lighting fixture.

Yet another object of the present invention is to provide a trim for a recessed lighting fixture which includes a rotatable yoke in combination with a carrier which exhibits sufficient strength in a useable configuration for installation as a permanent portion of a recessed lighting fixture.

The invention possesses other objects and advantages especially as concerns particular characteristics and features thereof which will become apparent as the specification continues.

Figure 1:
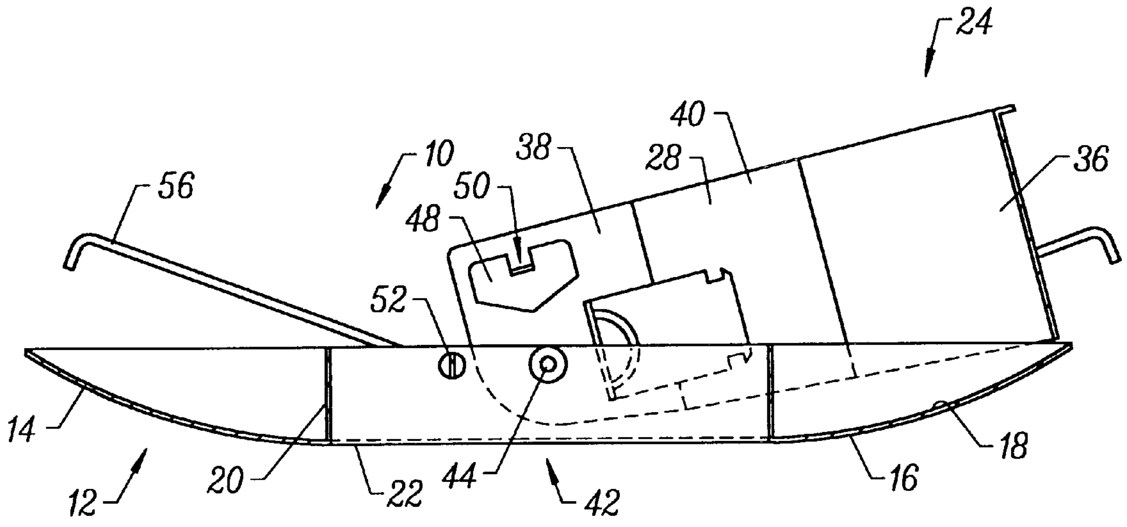
FIG. 1 is a side elevational view of the trim of the present invention in which the yoke is in a folded configuration.

For a better understanding of the invention references is made to the following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred embodiments thereof which should be taken in conjunction with the hereinbefore described drawings.

The invention as a whole is depicted in the drawings by reference character 10. Trim 10 is intended for use with a recessed lighting fixture commonly known as a "can" (not shown). That is to say, trim 10 is placed upwardly against the lower portion of the can and in contact with the panel or wall material that surrounds the can. Trim 10 includes a carrier 12 including a curved ring 14 having an outer surface 16 and an inner surface 18. Flange 20 extends outwardly from the inner edge 22 of ring 14. Carrier 12 may be constructed of any suitable rigid or semi-rigid material such as metal, plastic, wood, and the like.

Yoke 24 is also found in the present invention as part of trim 10. Yoke 24 includes legs 26 and 28, which extend from spanning element 30. Spanning element 30 includes opening 32 which forms a collar 34 that is intended to at least partially surround the socket and lamp which is found in a recessed lighting fixture, not shown.

Figure 2:
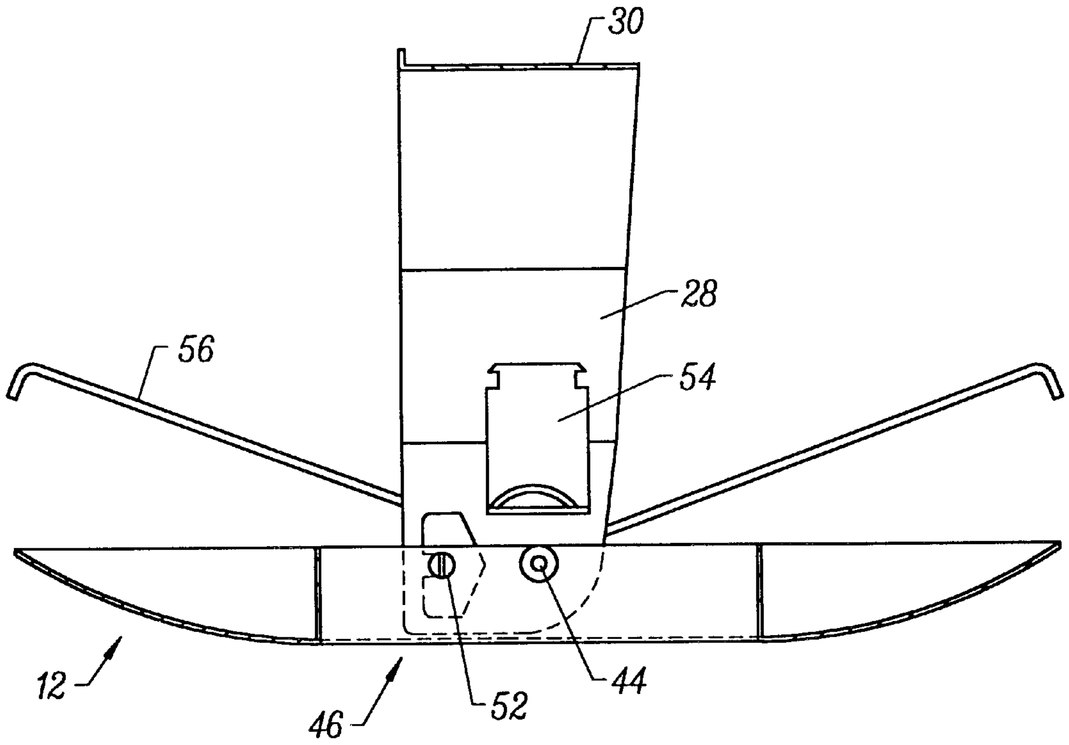
FIG. 2 is a side elevational view of the trim of the present invention in which the yoke has been extended outwardly into its useable configuration.

Turning to FIGS. 1 and 2, it may be observed that leg 28 is depicted as being substantially identical to leg 26 of yoke 24, but the mirror image thereof.

Leg 28 includes a first upper portion 36 connected to spanning member 30 and a lower portion 38. Intermediate portion 40 connects lower portion 38 to upper portion 36 of leg 28. Rotation means 42 is exhibited in the present invention and is best shown in FIGS. 1 and 2 with respect to leg 28. It should be understood that the same mechanism applies to leg 26 of yoke 24. Rotation means 42 includes a pivot pin 44 which extends between flange 20 and lower portion 38 of leg 28. Thus, leg 28 may be folded downwardly as shown in FIG. 1 by rotation of leg 28 relative to carrier 12. FIG. 2 represents the upward rotation of leg 28 around pivot pin 44. The position of yoke 24 depicted in FIG. 2 represents a configuration of trim 10 in conjunction with a recessed lighting fixture.

Figure 3:
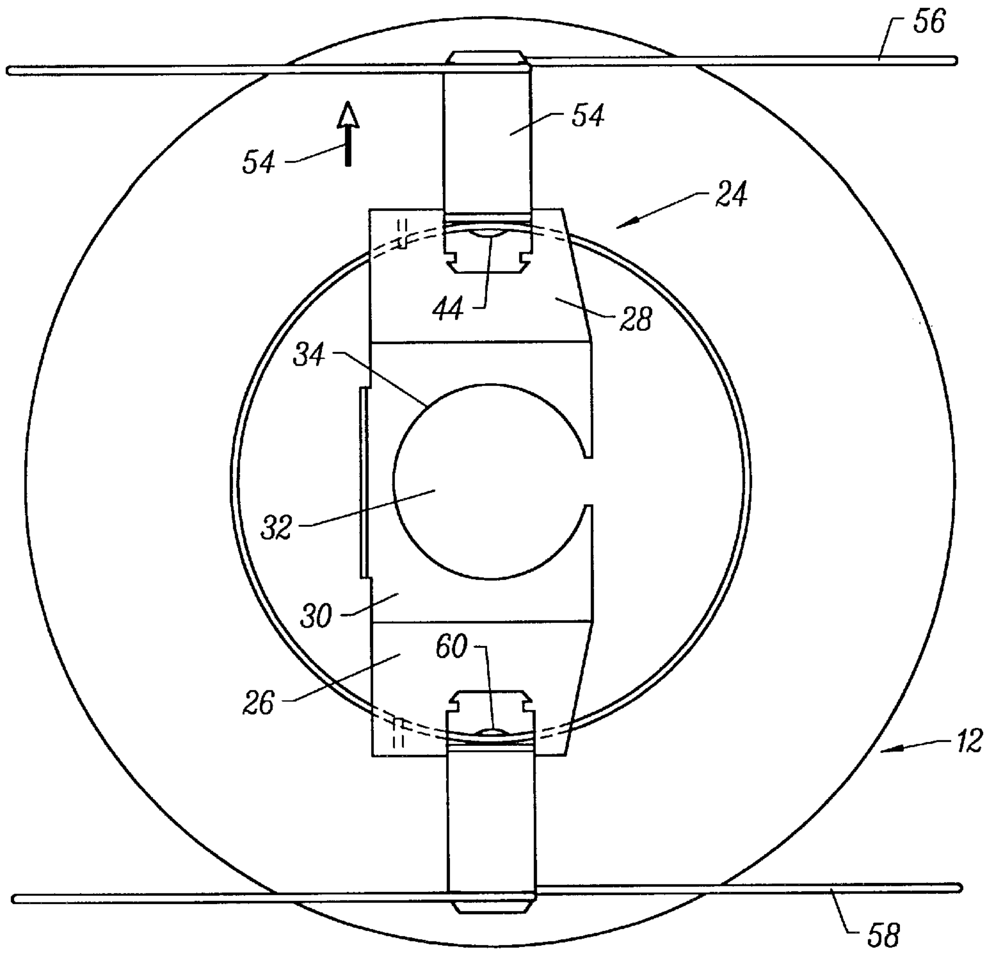
FIG. 3 is a top plan view of the trim depicted in FIG. 2.
Figure 4:
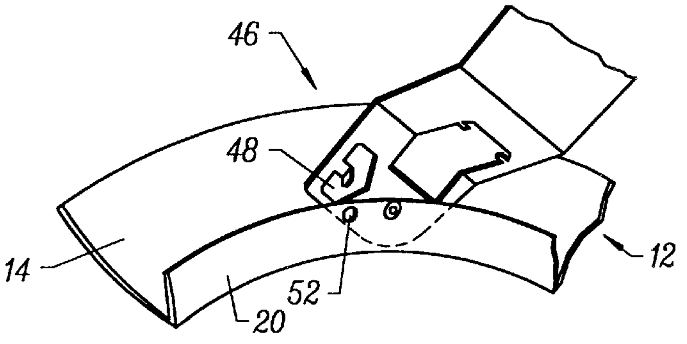
FIG. 4 is an isometric detail of the rotation and latching means of the present invention.

Latching means 46 is also depicted in the drawings, best shown in FIGS. 1, 2, and 4. Latching means 46 includes a plate 48 having a recess 50. Recess 50 is capable of engaging a protuberance 52 which is shown as a screw in the drawings. Leg 28 is spring biased outwardly according to directional arrow 4, FIG. 3, such that mating of protuberance 52 and recess 50 is maintained. That is to say, an inward force must be exerted on leg 28 to unlatch leg 28.

Opening 54 extends from leg 28 and frames spring member 56 known as a "chicken leg". Spring member 56 and spring member 58 are employed to hold trim within a recessed lighting fixture and are of conventional configuration.

In operation, yoke 24 is rotated into the folded position shown in FIG. 1 relative to carrier 12 and shipped to the user. Trim 10 is then readied for use by extending yoke 24 upwardly into the position shown in FIG. 2. At this point, legs 26 and 28 rotate about pins 44 and 60. Plate 48 engages and locks into protuberance 52 of latching means 46 with respect to leg 28. A similar latching means is employed with leg 26. The outward spring bias of legs 26 and 28 maintain the same in the upright position shown in FIG. 2, such that trim 10 is ready for use and will remain in that position until legs 26 and 28 are squeezed inwardly. Trim 10 is then inserted in a ceiling or wall such that a lamp socket lies within collar 34 at a proper position.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A trim for a recessed lighting fixture, comprising;

a. a carrier including a member and a flange extending outwardly from and connected to said member, said member further including an opening therethrough;

b. a yoke having first and second legs, said yoke further including a spanning element connecting said first and second legs;

c. rotation means for linking said yoke to said carrier and for folding said yoke toward and away from said carrier; and d. latching means for stopping the rotation between said first and second legs and said carrier at a position of rotation of said yoke away from said carrier, said latching means comprising said first and second legs being spring biased outwardly from said carrier flange, a protuberance and an element having a recess for at least partially encompassing said protuberance, said element recess being urged into said at least partial encompassing of said protuberance by said at least one of said spring biased first and second legs, during folding of said yoke away from said carrier by said rotation means.

2. The trim of claim 1 in which said rotation means comprises a first pivot between said first leg and said carrier and a second pivot between said second leg and said carrier.

3. The trim of claim 2 in which said first and second pivots include a first and second pivot pin; respectively, said first and second pivot pins engaging said flange of said carrier.

4. The trim of claim 1 in which said latching means includes a first protuberance and a first element having a recess for at least partially encompassing said protuberance associated with said first leg, and a second protuberance and a second element for at least partially encompassing said second protuberance.

* * * * *